United States Patent
Ward et al.

(10) Patent No.: US 9,051,053 B2
(45) Date of Patent: Jun. 9, 2015

(54) SEAT BASE FOR AIRCRAFT

(71) Applicant: Cessna Aircraft Company, Wichita, KS (US)

(72) Inventors: Barry Ward, Bel Aire, KS (US); Daniel James Hoverson, Valley Center, KS (US); Prasannakumar Bhonge, Wichita, KS (US); Thang Chien Phi, Bel Aire, KS (US)

(73) Assignee: Textron Innovations, Inc., Providence, RI (US)

( * ) Notice: Subject to any disclaimer, the term of this patent is extended or adjusted under 35 U.S.C. 154(b) by 182 days.

(21) Appl. No.: 13/738,755

(22) Filed: Jan. 10, 2013

(65) Prior Publication Data

US 2014/0191081 A1   Jul. 10, 2014

(51) Int. Cl.
  *B64D 11/06* (2006.01)
  *B64D 25/04* (2006.01)

(52) U.S. Cl.
  CPC ............ *B64D 11/06* (2013.01); *B64D 11/0689* (2013.01); *B64D 25/04* (2013.01); *B64D 11/0696* (2013.01); *B64D 11/0619* (2014.12)

(58) Field of Classification Search
  CPC ............ B64D 11/06; B60N 2/02; B60N 2/04; B60N 2/07; B60N 2/015; B60N 2/005; A47C 7/02; A47C 7/54
  USPC ............ 248/503.1, 421, 346.01, 346.03, 157, 248/163.1; 297/216.16, 344.21, 344.22, 297/411.36, 411.31; 244/118.5, 188.6, 244/118.1
  See application file for complete search history.

(56) References Cited

U.S. PATENT DOCUMENTS

| | | | |
|---|---|---|---|
| 5,636,901 A * | 6/1997 | Grilliot et al. | 297/452.18 |
| 5,788,185 A | 8/1998 | Hooper | |
| 5,795,025 A * | 8/1998 | Murphy | 297/411.36 |
| 5,868,472 A * | 2/1999 | Grilliot et al. | 297/452.18 |
| 7,182,403 B2 | 2/2007 | Williamson et al. | |
| 7,195,319 B2 * | 3/2007 | Williamson et al. | 297/452.18 |
| 7,210,740 B2 * | 5/2007 | Chintapudi et al. | 297/316 |
| 7,905,450 B2 | 3/2011 | Kennedy et al. | |
| 2004/0195886 A1 | 10/2004 | Beatty et al. | |
| 2005/0109877 A1 * | 5/2005 | Williamson et al. | 244/118.1 |
| 2006/0214482 A1 | 9/2006 | Williamson et al. | |
| 2006/0263164 A1 * | 11/2006 | Dowty et al. | 410/105 |
| 2008/0237398 A1 | 10/2008 | Kennedy et al. | |
| 2009/0114794 A1 * | 5/2009 | Rudduck et al. | 248/503.1 |
| 2011/0133030 A1 * | 6/2011 | Kennedy et al. | 244/118.5 |
| 2011/0233975 A1 * | 9/2011 | Mindel et al. | 297/216.17 |
| 2012/0049602 A1 * | 3/2012 | Kaessner | 297/451.7 |

OTHER PUBLICATIONS

PCT Patent Application PCT/US2014/011091 International Search Report and Written Opinion dated Apr. 1, 2014, 11 pages.

* cited by examiner

*Primary Examiner* — Nkeisha Smith
(74) *Attorney, Agent, or Firm* — Lathrop & Gage LLP

(57) ABSTRACT

A seat base for use in aircraft has a first cross member, a second cross member, a first leg, a second leg, and a base plate having a first bendable tab and a second bendable tab facing away from the first tab. The first cross member, the second cross member, and the base plate are each configured to be secured to the first and second legs in an extended position and a retracted position. The first and second legs are configured to be secured to seat feet and floor tracking rails. The first and second cross members are secured to the base plate so as to allow for selective rotation of the first and second cross members in response to relative vertical movement of the first leg with respect to the second leg.

17 Claims, 6 Drawing Sheets

SEAT BASE FOR AIRCRAFT

BACKGROUND OF THE INVENTION

1. Field of the Invention

The invention relates generally to the field of aircraft interior equipment. More specifically, the invention relates to a multi-configurable base for securement of seats, tables and other aircraft interior equipment.

2. Description of the Related Art

Aircraft seats are generally configured to absorb dynamic loads (e.g., during an emergency landing or a crash), as collapsing of the seats in response to dynamic loads may cause serious injury to the occupants. Several designs for seat bases have heretofore been disclosed to enable the seats to better absorb such loads. For example, U.S. Pat. No. 7,182,403 to Williamson et al. discloses a seat base having angled leg members which aid the base rails of the seat absorb energy during a dynamic event.

Some aircraft seats may be arranged in multiple configurations. For example, U.S. patent application Ser. No. 12/048,646 by Kennedy et al. discloses a base for aircraft seats that has a support link sweeping out a lateral arc. The base is rigidly affixed to the frame, and the frame is mounted on the aircraft floor by a pin and clevis attachment. The configuration of the seat base in Kennedy ('646) may be altered by securing the base to the aircraft floor by floor tracking means instead of the pin and clevis attachment. Or, for example, the configuration of the base may be altered by replacing the rigidly mounted base with a swiveling sub-base having a thrust bearing.

SUMMARY

A seat base for use in aircraft according to one embodiment of the current invention comprises a first cross member, a second cross member, a first leg, a second leg, and a base plate having a first bendable tab and a second bendable tab facing away from the first tab. The first cross member, the second cross member, and the base plate are each configured to be secured to the first and second legs in an extended position and a retracted position. The first and second legs are configured to be secured to seat feet and floor tracking rails. The first and second cross members are secured to the base plate so as to allow for selective rotation of the first and second cross members in response to relative vertical movement of the first leg with respect to the second leg.

According to another embodiment, a seat base comprises a first leg, a second leg, a first cross member, a second cross member, and a base plate. The first leg has a side surface and a top surface. A first proximal slot, a first central slot and a first distal slot extends through the first leg side surface. A first proximal opening upwardly adjacent the first proximal slot, a first central opening upwardly adjacent the first central slot, and a first distal opening upwardly adjacent the first distal slot extends through the first leg top surface. The second leg similarly has a side surface and a top surface. A second proximal slot, a second central slot, and a second distal slot extends through the second leg side surface. A second proximal opening upwardly adjacent the second proximal slot, a second central opening upwardly adjacent the second central slot, and a second distal opening upwardly adjacent the second distal slot extends through the second leg top surface. The base plate has a first attachment member, a second attachment member, a first bendable tab, and a second bendable tab. The first attachment member and the first tab face away from the second attachment member and the second tab respectively. The first cross member, the second cross member, and the base plate are each configured to be secured to the first and second legs in an extended position and a retracted position. The first and second legs are configured to be secured to seat feet and floor tracking rails. The first and second cross members are secured to the base plate so as to allow for selective rotation of the first and second cross members in response to relative vertical movement of the first leg with respect to the second leg.

According to one embodiment, a seat base for use in aircraft comprises a first cross member, a second cross member, a first leg and a second leg. The seat base further includes a base plate having a first bendable tab and a second bendable tab facing away from the first tab. The first and second cross members are secured to the base plate so as to allow for selective rotation of the first and second cross members in response to relative vertical movement of the first leg with respect to the second leg. The first cross member, the second cross member, and the base plate are each configured to be secured to the first and second legs in an extended position and a retracted position.

According to yet another embodiment, a seat base comprises a first cross member, a second cross member, a first leg and a second leg. The seat base further includes a base plate having a first bendable tab and a second bendable tab facing away from the first tab. The first and second legs are configured to be secured to seat feet and floor tracking rails.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
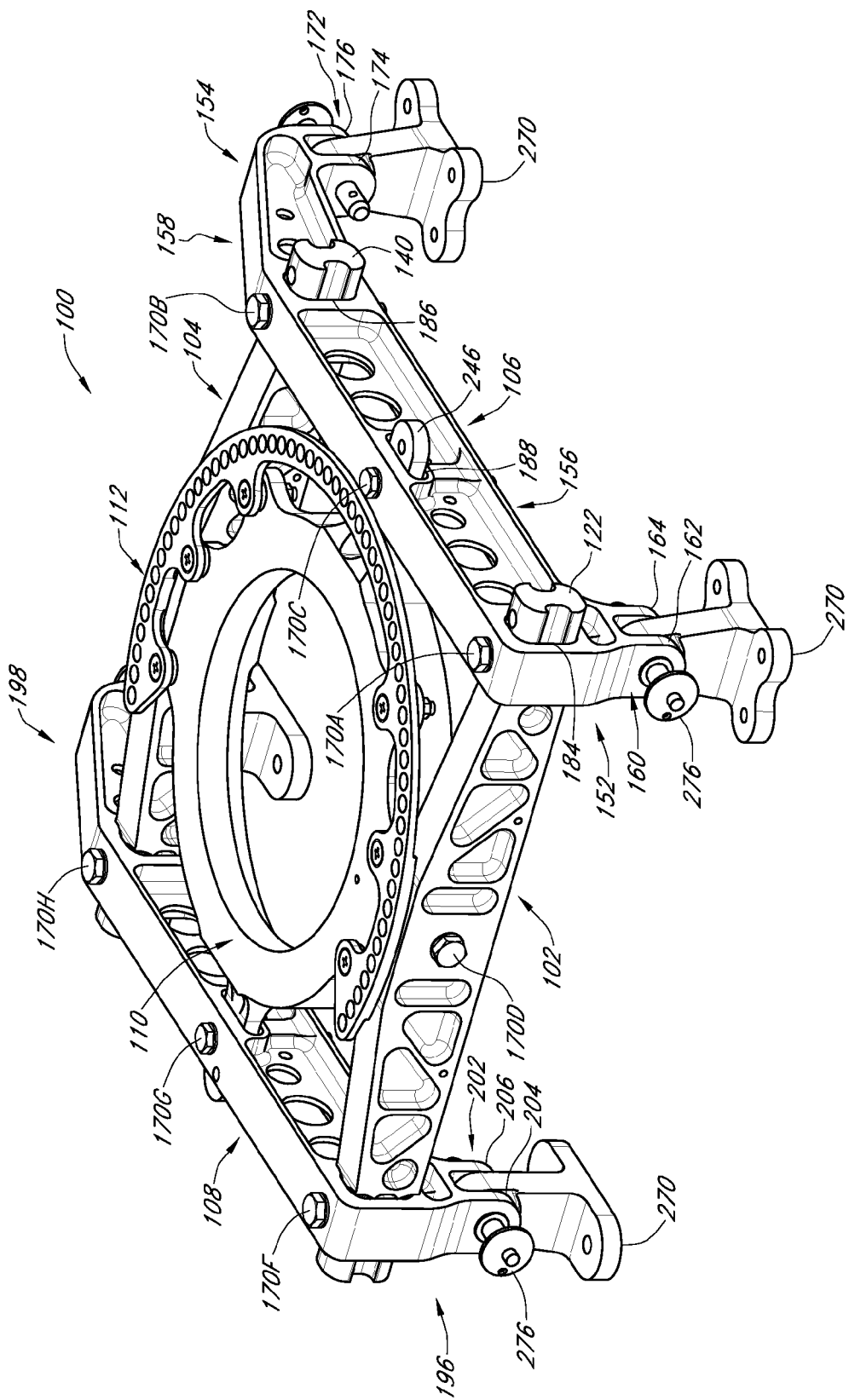
FIG. 1 is a perspective view of a seat base in line with the teachings of the current invention in a retracted configuration.

Embodiments of the present invention provide systems and methods for the construction and assembly of a multi-configurable seat base primarily for use in aircraft. FIG. 1 shows an embodiment 100 of a seat base in accordance with the teachings of the current invention. As can be seen, the seat base 100 includes a first cross member 102, a second cross member 104, a first leg 106, a second leg 108, a base plate 110, and a swivel ring 112.

Figure 2:
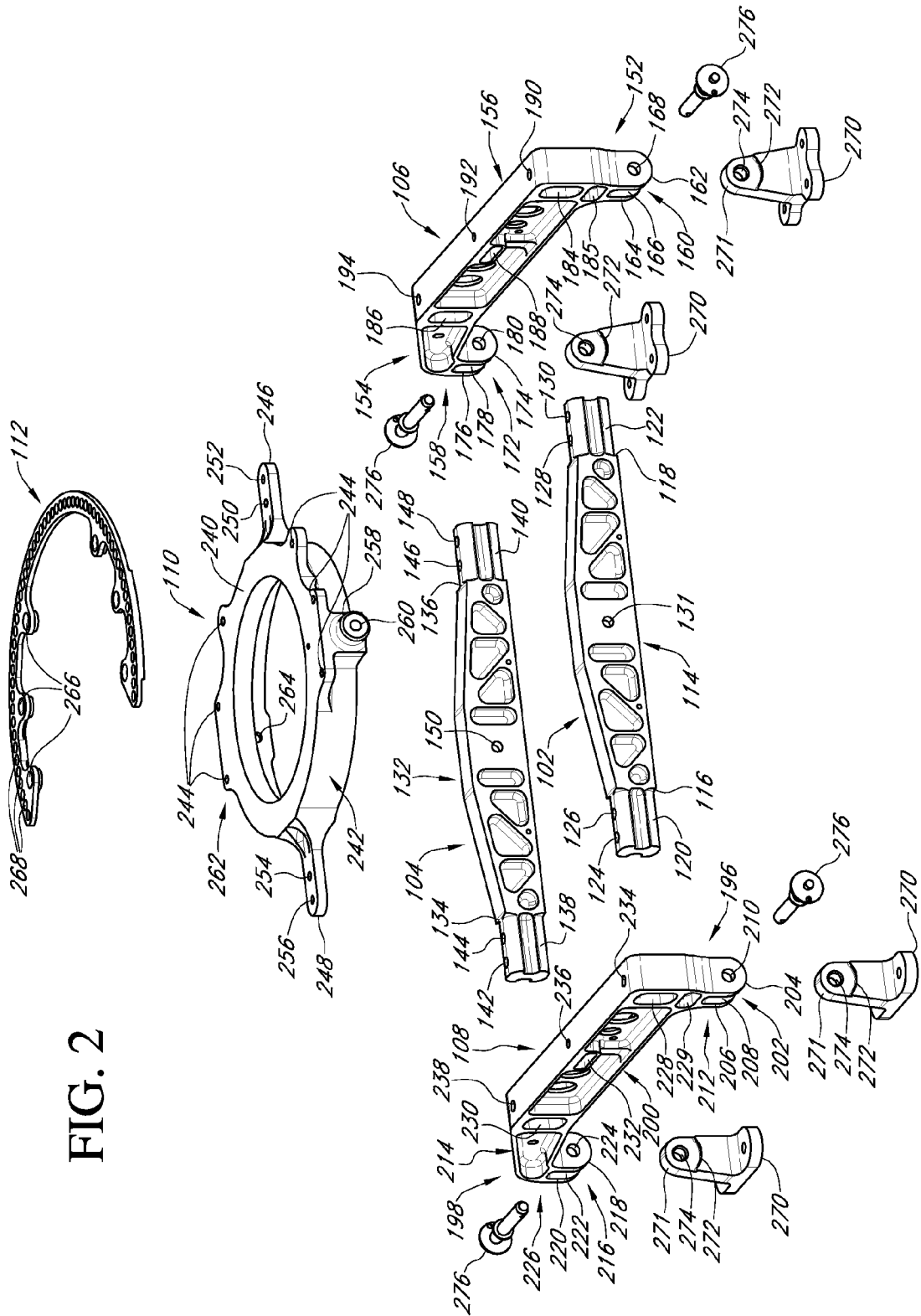
FIG. 2 is an exploded view showing some of the components used to form the seat base of FIG. 1.

FIG. 2 shows these components disassembled. The first cross member 102 may have a central portion 114 having edges 116 and 118. A side member 120 may extend from the edge 116, and a side member 122 may extend from the edge 118. The side member 120, towards its upper face, may have a first opening 124 and a second opening 126. These openings 124, 126 may extend through the lower face of side member 120. The spacing between the first and second openings 124, 126 may be between 0.5 and three inches, and preferably is approximately 1.5 inches. The side member 122 may similarly have first and second openings 128, 130, which may be spaced akin to the first and second openings 124, 126 of the side member 120. The openings 124, 126, 128, and 130 may be configured to receive fasteners (e.g., nuts, bolts, washers, et cetera). The central portion 114 and the side members 120, 122 of the first cross member 102 may be of a unitary construction. An opening 131, which may generally be located towards the center of the front face of the central portion 114, may extend through the central portion 114.

As evident from FIG. 2, the second cross member 104 may be generally identical to the first cross member 102. The second cross member 104 may similarly have a central portion 132 having edges 134 and 136. A side member 138 may extend from the edge 134, and a side member 140 may extend from the edge 136. First and second openings 142, 144 may extend through the upper face of the side member 138, and these openings 142, 144 may extend through the lower face of the side member 138. The side member 140 may similarly have first and second openings 146, 148 respectively extending through its upper face. The spacing between the first and second openings 142, 144 in the side member 138 may be between 0.5 and three inches, and is preferably about 1.5 inches. The spacing between the first and second openings 146, 148 in the side member 140 may be generally equal to the spacing between the first and second openings 142, 144 in the side member 138. The openings 142, 144, 146, 148, like openings 124, 126, 128, and 130, may be configured to receive fasteners. An opening 150, which may generally be located towards the center of the front face of the central portion 132, may extend through the central portion 132.

Figure 3:
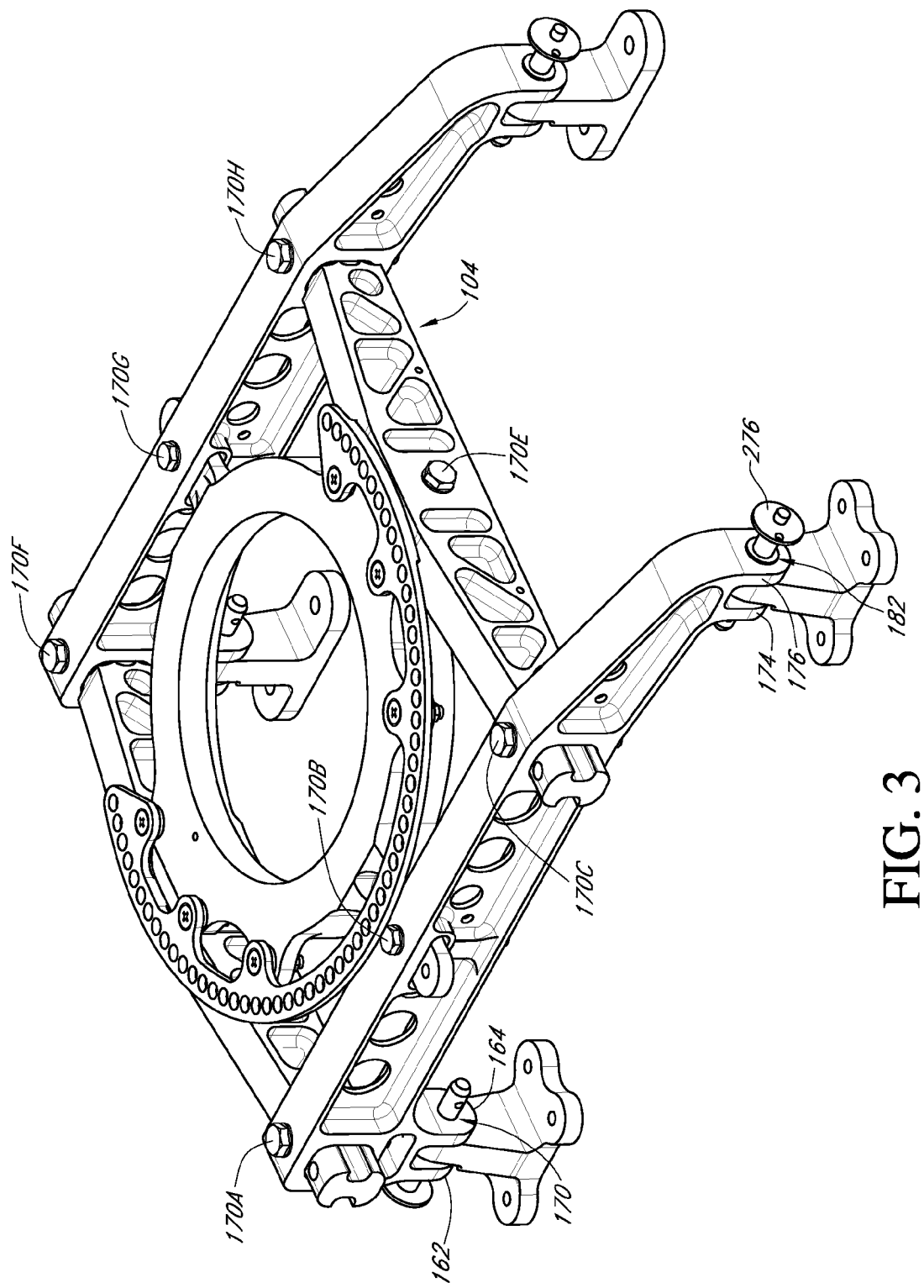
FIG. 3 is another perspective view of the seat base of FIG. 1.

The first leg 106 may have a proximal side 152 and a distal side 154. A straight portion 156 of the first leg 106 may extend from the proximal side 152 towards the distal side 154. A first receiving member 160 may generally extend vertically downward from the straight portion 156 at the proximal side 152. The first receiving member 160 may comprise two semi-circular portions 162, 164 having a space 166 therebetween (see FIG. 2). An opening 168 may extend through the semi-circular portion 162 (FIG. 2), and an opening 170 (see FIG. 3) may extend through the semi-circular portion 164. The opening 168 may correspond to and be aligned with the opening 170, and these openings 168, 170 may be configured to receive a fastener.

A sloped portion 158 of the first leg 106 may originate towards the distal side 154 from the straight portion 156 and slope downwards (see FIG. 1). A second receiving member 172 may generally extend downward from the sloped portion 158 at the distal side 154. Akin to the first receiving member 160, the second receiving member 172 may comprise two semi-circular portions 174 and 176 having a space 178 therebetween. An opening 180 may extend through the semi-circular portion 174, and an opening 182 (see FIG. 3) may extend through the semi-circular portion 176. The openings 180, 182, much like the openings 168, 170, may correspond to and be aligned with each other, and be configured to receive a fastener.

The straight portion 156 of the first leg 106, towards the proximal side 152, may have a proximal opening or slot 184 that extends through the side faces of the straight portion 156. The slot 184 may be configured to receive the side member 122 of the first cross member 102. A generally identical distal opening or slot 186 may also be present in the straight portion 156 towards the distal side 154, and be configured to receive the side member 140 of the second cross member 104. The straight portion 158 may further include a central opening or slot 188 (see FIG. 2), which as discussed below, may be configured to receive a bendable tab of the base plate 110. The straight portion may also have openings 190, 192, and 194 that extend through its top face above the proximal slot 184, the central slot 188, and the distal slot 186, respectively.

As can be appreciated from FIG. 2, the second leg 108 may be generally identical to the first leg 106. The second leg may have a proximal side 196 and a distal side 198 (see FIG. 1). A straight portion 200 of the second leg 108 may extend from the proximal side 196 towards the distal side 198. Akin to the first receiving member 160 of the first leg 106, a first receiving member 202 comprising two semi-circular portions 204, 206 having a space 208 therebetween may generally extend vertically downward from the straight portion 200 at the proximal side 196 of the second leg 108. Openings 210 and 212 (not clearly visible in FIG. 2) may respectively extend through the semi-circular portions 204 and 206. These openings 210, 212 may correspond to and be aligned with each other, and may be configured to receive a fastener.

A sloped portion 214 of the second leg 108, similar to the sloped portion 158 of the first leg 106, may originate towards the distal side 198 and slope downwards. A second receiving member 216 may generally extend downward from the sloped portion 214 at the distal side 198. The second receiving member 216 may, like the first receiving member 202, comprise two semi-circular portions 218, 220 having a space 222 therebetween. An opening 224 may extend through the semi-circular portion 218, and an opening 226 (not clearly visible in FIG. 2) may similarly extend through the semi-circular portion 220. These openings 224, 226 may be aligned with each other and be configured to receive a fastener.

The straight portion 200 of the second leg 108, towards its proximal side 196, may have a proximal opening or slot 228 that extends through the side faces of the straight portion 200. The proximal slot 228 may be configured to receive the side member 120 of the first cross member 102. A generally identical distal opening or slot 230 may also be present in the straight portion 200 towards the distal side 198, and be configured to receive the side member 138 of the second cross member 104. The straight portion 200 may include a central opening or slot 232 (see FIG. 2), which as discussed below, may be configured to receive a bendable tab of the base plate 110. The straight portion may also have openings 234, 236, and 238 that extend through its top face above the proximal slot 228, the central slot 232, and the distal slot 230 of the second leg 108, respectively.

The base plate 110 may be generally symmetrical, and may have a top surface 240 and a front surface 242. As can be seen in FIG. 2, multiple openings 244 may extend through the top surface. These openings 244 may be configured to receive fasteners. A tab 246, and a tab 248 that faces away from tab 246, may extend outward from the front surface 242. These tabs 246, 248 may be configured to bend in response to dynamic loads. Openings 250, 252 may extend through the upper and lower surfaces of the tab 246, and openings 254, 256 may extend through the upper and lower surfaces of the tab 248. The spacing between openings 250 and 252 in the tab 246 may be generally equal to the spacing between openings 254 and 256 in the tab 248, and be between about 0.5 inches and three inches, and is preferably about 1.5 inches.

An attachment member 258 may extend outward from the front surface 242 of the base plate 110. The attachment member 258 may include an opening 260 that extends through the front surface 242 and is configured for the reception of a fastener. While not clearly shown in the figures, an attachment member 262 that opposes the attachment member 258 may similarly extend outward from the front surface 242 and have an opening 264 that extends through the front surface 242 of the base plate 110. The attachment members 258, 262 may act as pivot points and allow for selective rotation of the first and second cross members 102, 104, as discussed in more detail below.

The swivel ring 112 may be generally semi-circular and have multiple openings 266 that extend through its top and bottom surfaces. These openings 266 may be configured such that when the swivel ring 112 is placed atop the base plate 110, one opening 266 corresponds to and becomes upwardly adjacent one opening 244 in the base plate 110. The swivel ring 112 may also include multiple grooves 268 that are configured for the reception and retention of a lock. Each groove 268 may be spaced from an adjacent groove 268 by between about 1 degree and about 12 degrees. In the preferred embodiment, each groove 268 is spaced from an adjacent groove 268 by four degrees, so as to allow a seat secured to the seat base 100 to swivel in four degree steps.

Having described some of the individual components of the seat base 100, a method of assembling the seat base 100 will now be outlined. People of skill in the art will appreciate that this method is exemplary only and that the seat base 100 may be assembled in other ways. The side member 122 of the first cross member 102 may first be passed through the proximal slot 184 in the first leg 106 such that the opening 128 in the side member 122 becomes downwardly adjacent the opening 190 in the first leg 106. A fastener 170A (see FIG. 1) may then be passed through the openings 190 in the first leg 106 and the opening 128 in the side member 122 to secure the first cross member 102 to the first leg 106; for example, after the fastener 170A has been passed through the openings 190, 128, a nut and washer may be secured at the bottom of the fastener 170A within a slot 185 in the first leg 106. As can be seen in FIG. 1, when assembled in this way, the side member 122 may extend beyond the proximal slot 184. The side member 140 of the second cross member 104 may then be passed through the distal slot 186 in the first leg 106 such that the opening 146 in the side member 140 becomes downwardly adjacent the opening 194 in the first leg. A fastener 170B may then be passed through the openings 194, 146 to secure the second cross member 104 to the first leg 106; for example, after the fastener 170B has been passed through the openings 194, 146, a nut and washer may be secured at the bottom of the fastener 170B underneath the first leg 106. In this configuration, the side member 140, like the side member 122, may extend beyond the distal slot 186.

The base plate 110 may then be configured between the first cross member 102 and the second cross member 104 such that its bendable tab 246 extends through the central slot 188 in the first leg 106 and the opening 250 in the tab 246 is downwardly adjacent the opening 192 in the first leg 106. A fastener 170C may be passed through the openings 192 in the first leg 106 and the opening 250 in the tab 246 of the base plate 110, with a nut and washer being secured at the bottom of the fastener 170C underneath the first leg 106. As can be appreciated from FIG. 1, in this configuration, the tab 246 extends past the central slot 188 in the first leg 106. A fastener or lock 170D may be passed through the opening 131 in the first cross member 102 and the opening 260 in the attachment member 258 of the base plate 110. A fastener 170E (see FIG. 3) may similarly be passed through the opening 150 in the second cross member 104 and the opening 264 in the attachment member 262 of the base plate 110.

The second leg 108 may now be secured to the structure. Specifically, the second leg 108 may be aligned such that the side member 120 of the first cross member 102 passes through the proximal slot 228 of the second leg 108 and the opening 126 in the side member 120 becomes downwardly adjacent the opening 234 in the second leg 102; the tab 248 of the base plate 110 passes through the central slot 232 of the second leg 108 such that the opening 254 in the tab 248 becomes downwardly adjacent the opening 236 in the second leg 102; and the side member 138 of the second cross member 104 extends through the distal slot 230 in the second leg 108 such that the opening 144 in the side member 138 becomes downwardly adjacent the opening 238 in the second leg 108. Fasteners 170F, 170G, and 170H may then be passed through the openings 234 126, the openings 236, 254, and the openings 238, 144, respectively to secure the second leg 108 to the first cross member 102, the second cross member 104, and the base plate 110. Nuts and washers corresponding to the fasteners 170F, 170G, and 170H may be secured at the bottom as outlined with respect to the first leg 106. For example, the second leg 108 may have a slot 229 for housing the nut and washer corresponding to fastener 170F.

Assembly of the seat base 100 is now generally complete, and the seat base 100 may now be secured to seat feet 270. The feet 270 may each include a head 271, a semi-circular groove 272 (see FIG. 2) on the front face, and while not required, an additional semi-circular groove 272 on the back face. An opening 274 may extend through the front and back faces of the feet 270. The semi-circular grooves 272 may be configured to mate with the semi-circular portions 162, 164 of the first receiving member 160 and the semi-circular portions 174, 176 of the second receiving member 172 of the first leg 106, and the semi-circular portions 204, 206 of the first receiving member 202 and the semi-circular portions 218, 220 of the second receiving member 216 of the second leg 108. This configuration allows the seat base 100 to be coupled to the seat feet 270 quickly and with ease. Specifically, the seat base 100 may simply be pushed down on the seat feet 270 such their heads 271 extend into the spaces 166, 178, 208, and 222 between the semi-circular portions of the receiving members 160, 172, 202, 216 respectively and mate with the semi-circular portions of the receiving members 160, 172, 202, and 216. Fasteners 276 may then be passed through the openings 168 and 170, 180 and 182, 210 and 212, and 224 and 226 of the receiving members and the openings 274 in the seat feet 270. In this configuration, the leg space afforded by the seat base 100 (i.e., the lateral distance between the fastener 276 on the proximal side 152 of the first leg 106 and the fastener 276 on the proximal side 196 of the second leg 108) may be approximately equal to nine inches.

Figure 4:
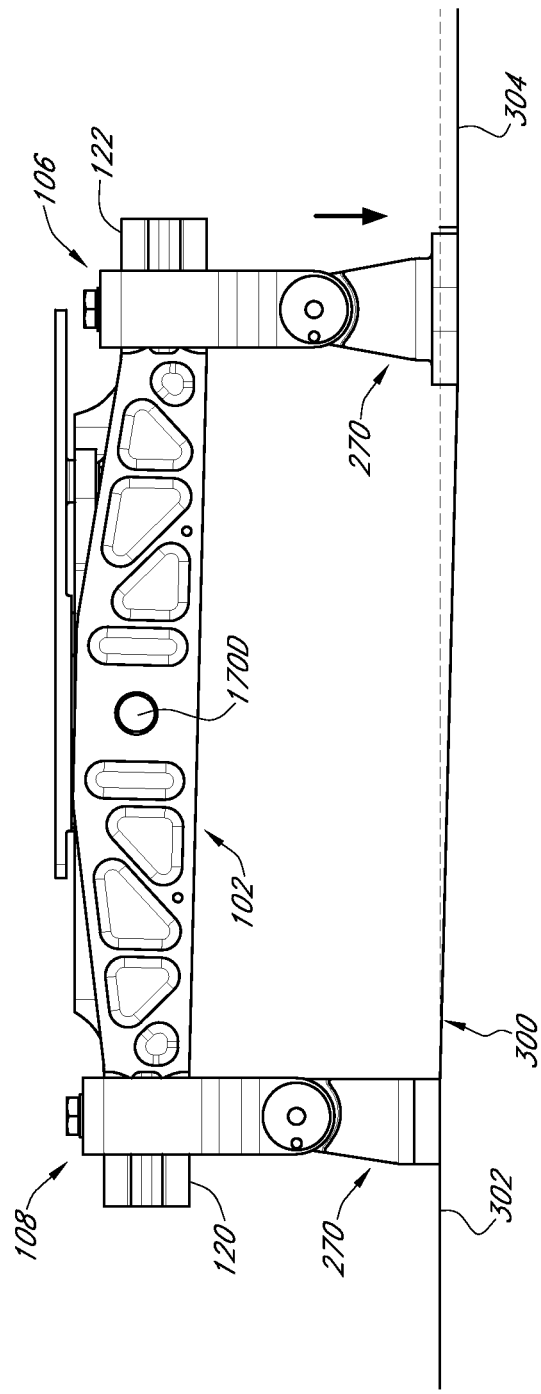
FIG. 4 is a side view of the seat base of FIG. 1 illustrating the selective rotation of cross members of the seat base of FIG. 1 in response to floor deformation.

The floor an aircraft may deform due to the application of significant forces on the aircraft; for example, during a crash, the significant external forces to which the aircraft is subjected may cause its floor to deform temporarily or even permanently. It is important that aircraft seats withstand such relative deformation of the aircraft floor and function without imposing excessive loads on the seats, as otherwise, the seats may uproot from the aircraft floor and severely injure the passengers seated thereon. The design outlined herein enables the seat base 100 to absorb and withstand dynamic loads. Attention is directed to FIG. 4 to illustrate the response of the seat base 100 to floor deformation.

Consider, for example, that the seat base 100 is secured via the seat feet 270 to an aircraft floor 300. The floor 300 has a straight portion 302 and a deformed portion 304. The deformed portion 304 (as illustrated by the dotted line which shows the floor 300 in a non-deformed state) has deformed and become lower than the straight portion 302. As can be appreciated, the first leg 106 is secured to the deformed portion 304 of the floor 300 while the second leg 108 is secured to the straight portion 302. As the deformed portion 304 deforms and becomes lower than the straight portion 302, it causes the first leg 106 secured thereto to also become lower than the second leg 108. The first leg 106, as it moves downward along with the deformed portion 304 of the floor 300, exerts a downward force on the side member 122 of the first cross member 102 and the side member 140 (see FIG. 2) of the second cross member 104. In a conventional seat, application of such force to only one side of the cross members 102, 104 may have caused the cross member 102, 104 to bend, deform permanently, or even break. The seat base 100 avoids this problem by allowing the cross member 102, 104 to rotate in response to the downward movement of the first leg 106 (or the second leg 108). Specifically, the cross member 102, instead of bending, pivots on lock 170D and selectively rotates such that the side member 122 of the first leg 102 becomes lower than the side member 120. Similarly, the side member 104 pivots on lock 170E (see FIG. 3) such that the side member 140 becomes lower than the side member 138. The ability of the cross members 102, 104 to rotate instead of bending enables the seat 100 to better withstand floor deformation.

The first leg 106, as it moves downward along with the deformed portion 304 of the floor 300, also exerts a downward force on the tab 246 (see FIG. 1) of the base plate 110 and attempts to pull down the base plate 110 from one side. The tab 246 however, is designed to be bendable, and bends in response to the downward movement of the first leg 106. The bendable tab 246 absorbs much of the torsion load that would have otherwise caused the base plate 110 to bend down along with the first leg 106. The base plate 110, thus, remains generally stationery and flat, notwithstanding the deformation of the floor 300. While the disclosure above outlines how the seat base 100 may respond to deformation of the floor 300 underneath the first leg 106, people of skill in the art will appreciate that the seat base 100 may respond similarly to other floor deformations (e.g., deformation of floor 300 underneath the second leg 108).

Figure 5:
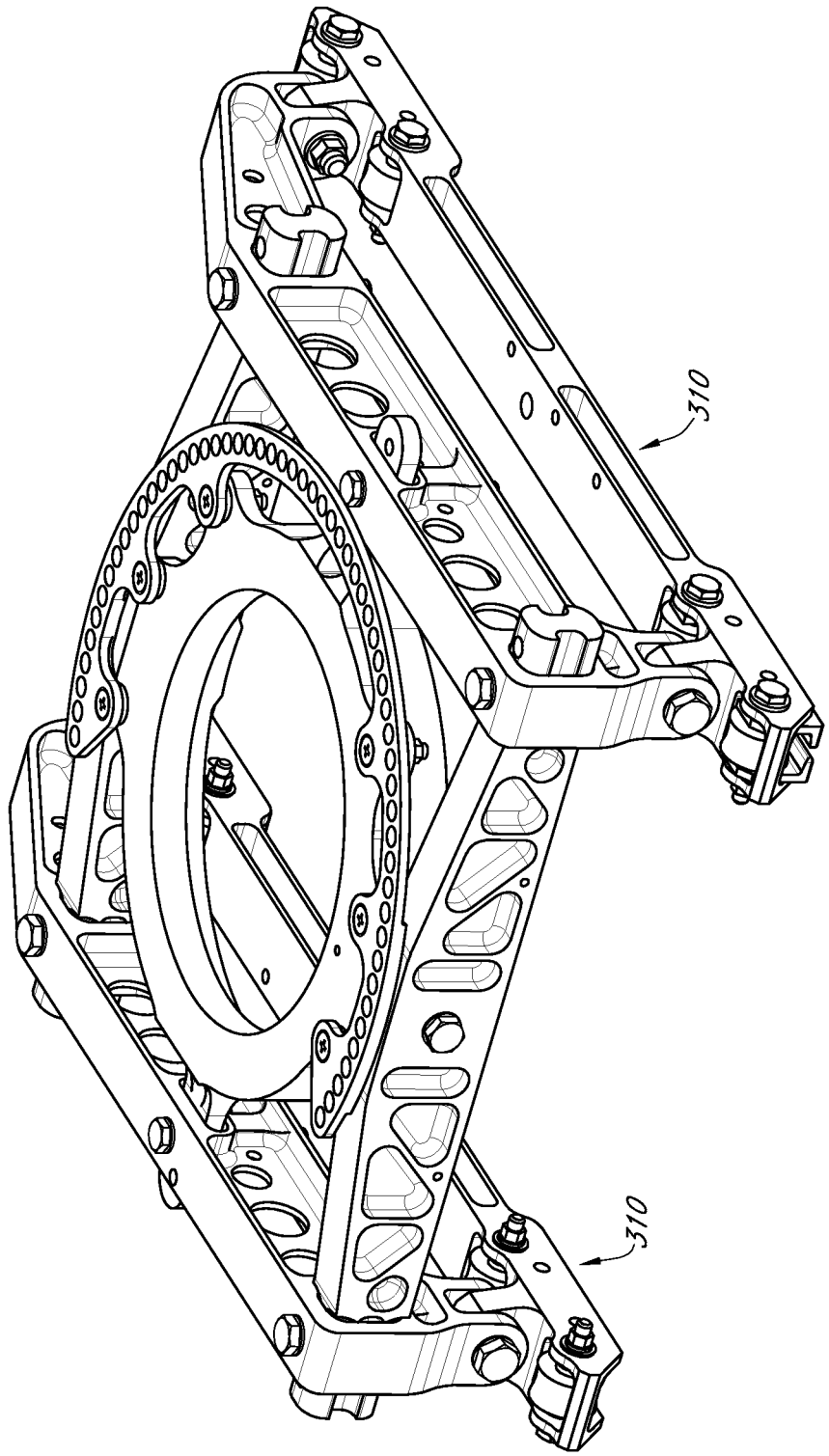
FIG. 5 is a perspective view of the seat base of FIG. 1 with its pedestal feet replaced with floor tracking rails.
Figure 6:
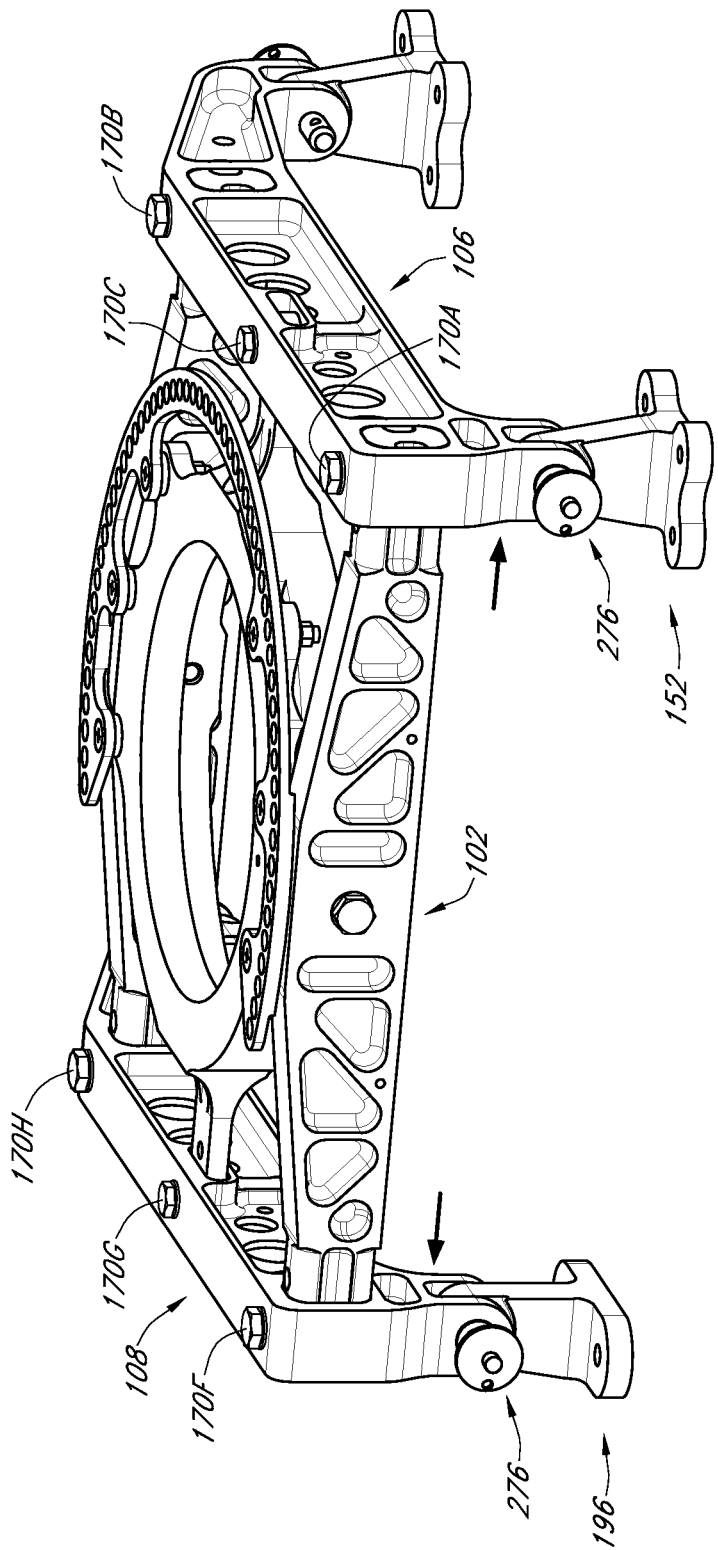
FIG. 6 is a perspective view of the seat base of FIG. 1 in an extended configuration.

The seat base 100 is highly versatile. Specifically, the seat base 100 may be easily set up in multiple configurations without affecting the structural loading of the seat base 100. For example, as shown in FIG. 5, instead of being secured to the stationery seat feet 270 (see FIG. 1), the receiving members 160, 172 of the first leg 106 and the receiving members 202, 216 of the second leg 108 may be conveniently secured to floor tracking rails 310. This feature allows the seat base 100 to become movable relative to the aircraft floor, without affecting the height of the seat base 100 or the need to replace any component of the seat base 100 (except the feet 270).

As illustrated in FIG. 5, the leg space (i.e., the lateral distance between the fastener 276 on the proximal side 152 of the first leg 106 and the fastener 276 on the proximal side 196 of the second leg 108 (see FIG. 1)) afforded by the seat base 100 may be adjusted. Specifically, as outlined above, when the seat base 100 is assembled using the opening 126, 128 in the side members 120, 122 of the first cross member 102, the openings 144, 146 in the side members 138, 140 of the second cross member 104, and the openings 250, 254 in the bendable tabs 246, 248 of the base plate 110, respectively, the leg space afforded by the seat base 100 in the preferred embodiment is about nine inches (i.e., the seat base 100 is an a retracted position). To increase the leg space, the first leg 106 is secured: (i) to the first cross member 102 by fastener 170A using opening 130 in the side member 122 (instead of the opening 128); (ii) to the base plate 110 by fastener 170C using opening 252 in the tab 246 (instead of opening 250); and (iii) to the second cross member 104 by fastener 170B using opening 146 in the side member 140 (instead of opening 136) (see FIG. 2). Similarly, the second leg 108 is secured: (i) to the first cross member 102 by fastener 170F using opening 124 in the side member 120 (instead of the opening 126); (ii) to the base plate 110 by fastener 170G using opening 256 in the tab 248 (instead of opening 254); and (iii) to the second cross member 104 by fastener 170H using opening 142 in the side member 138 (instead of opening 144). The leg space afforded by the seat base 100 in this extended position thus increases from about 9 inches to about 12 inches, without significantly affecting the loading of the seat base 100. People of skill in the art will appreciate that by altering the spacing between the respective openings in the side members 120, 122, 138, 140, and the tabs 246, 248, the leg space afforded by the seat base 100 can be set to be any desirable distance. The seat base 100 thus can be safely and conveniently used with aircraft having varying fuselage sizes and seat feet/rail spacing.

The seat base 100 can be configured in an aircraft as an aft-facing seat or a front facing seat. As can be seen from FIG. 1, except for the swivel ring 112, left and right portions of the seat base 100 (i.e., portions to the left of fasteners 170D, 170E and to the right of fasteners 170D, 170E) are generally identical. This symmetry further allows the seat base 100 to be secured to the right side of the fuselage or its left side. Specifically, in FIG. 1, the swivel ring 112 is shown secured to the base plate 110 such that the open face of the swivel ring 112 faces the second leg 108; however, to reverse the direction in which the seat swivels, the swivel ring 112 can just as easily be secured to the base plate 110 such that the open face of the swivel ring 112 faces the first leg 106. By simply changing the orientation of the swivel ring, thus, a seat base 100 secured to the right side of the fuselage may be secured to the left side of the fuselage, and vice versa. In some embodiments, the swivel ring 112 may be removed from the seat base 100 altogether to prevent a seat secured to the seat base 100 from rotating. People of skill in the art will appreciate that while the seat base 100 disclosed above is primarily configured for securement of a seat, that other aircraft interior equipment (e.g., tables) may also be secured thereto.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:
1. A seat base for use in aircraft comprising:
a first cross member and a second cross member;
a first leg and a second leg; and
a base plate having a first bendable tab and a second bendable tab facing away from the first tab;
wherein the first cross member, the second cross member, and the base plate are each configured to be secured to the first and second legs in an extended position and a retracted position;
wherein the first and second legs are configured to be secured to seat feet and floor tracking rails;

wherein the first and second cross members are secured to the base plate so as to allow for selective rotation of the first and second cross members in response to relative vertical movement of the first leg with respect to the second leg.

2. The seat base of claim 1, wherein:
the first leg is generally identical to the second leg; and
the first cross member is generally identical to the second cross member.

3. The seat base of claim 2 wherein:
the first and the second legs each have a central slot;
the first bendable tab is secured within the central slot of the first leg; and
the second bendable tab is secured within the central slot of the second leg.

4. The seat base of claim 3, wherein:
the first leg and the second leg each have a proximal slot and a distal slot;
the first cross member is secured within the proximal slot of the first leg and the proximal slot of the second leg; and
the second cross member is secured within the distal slot of the first leg and the distal slot of the second leg.

5. The seat base of claim 4, wherein the first and second tabs are configured to bend in response to relative vertical movement of the first leg with respect to the second leg.

6. The seat base of claim 1 wherein:
the first leg and the second leg each include a receiving member;
each receiving member has two semi-circular portions.

7. The seat base of claim 6 wherein the seat feet comprise semi-circular grooves configured to mate with the semi-circular portions.

8. The seat base of claim 1 further comprising a swivel ring secured to the base plate.

9. The seat base of claim 8 wherein the swivel ring comprises a plurality of openings, each opening in the plurality being spaced about four degrees apart from an adjacent opening.

10. The seat base of claim 8 wherein:
the first and second legs each have a straight portion and a sloped portion; and
leg space afforded by the seat base in retracted and extended positions is about nine inches and about twelve inches respectively.

11. A seat base comprising:
a first leg having a side surface and a top surface, a first proximal slot, a first central slot and a first distal slot extending through the first leg side surface, a first proximal opening upwardly adjacent the first proximal slot, a first central opening upwardly adjacent the first central slot, and a first distal opening upwardly adjacent the first distal slot extending through the first leg top surface;
a second leg having a side surface and a top surface, a second proximal slot, a second central slot, and a second distal slot extending through the second leg side surface, a second proximal opening upwardly adjacent the second proximal slot, a second central opening upwardly adjacent the second central slot, and a second distal opening upwardly adjacent the second distal slot extending through the second leg top surface;
a first cross member having a top surface and a side surface with a first central aperture extending therethrough, the first cross member including at opposing ends a first side member and a second side member, the first side member having a first aperture and a second aperture extending through the top surface, the second side member having a third aperture and a fourth aperture extending through the top surface;
a second cross member having a top surface and a side surface with a second central aperture extending therethrough, the second cross member including at opposing ends a third side member and a fourth side member, the third side member having a fifth aperture and a sixth aperture extending through the top surface, the fourth side member having a seventh aperture and an eighth aperture extending through the top surface; and
a base plate having a first attachment member, a second attachment member, a first bendable tab, and a second bendable tab, the first attachment member and the first tab respectively facing away from the second attachment member and the second tab;
wherein the first cross member, the second cross member, and the base plate are each configured to be secured to the first and second legs in an extended position and a retracted position;
wherein the first and second legs are configured to be secured to seat feet and floor tracking rails;
wherein the first and second cross members are secured to the base plate so as to allow for selective rotation of the first and second cross members in response to relative vertical movement of the first leg with respect to the second leg.

12. The seat base of claim 11, further comprising a swivel ring secured to the base plate; and
wherein the swivel ring comprises a plurality of openings, each opening in the plurality being spaced about four degrees apart from an adjacent opening.

13. The seat base of claim 12, wherein the first and second tabs are designed to bend in response to relative vertical movement of the first leg with respect to the second leg.

14. The seat base of claim 13 wherein:
the first leg and the second leg each include a receiving member;
each receiving member has two semi-circular portions.

15. The seat base of claim 14 wherein the seat feet comprise semi-circular grooves configured to mate with the semi-circular portions.

16. A seat base for use in aircraft comprising:
a first cross member and a second cross member;
a first leg and a second leg; and
a base plate having a first bendable tab and a second bendable tab facing away from the first tab;
wherein the first and second cross members are secured to the base plate so as to allow for selective rotation of the first and second cross members in response to relative vertical movement of the first leg with respect to the second leg;
wherein the first cross member, the second cross member, and the base plate are each configured to be secured to the first and second legs in an extended position and a retracted position.

17. A seat base comprising:
a first cross member and a second cross member;
a first leg and a second leg; and
a base plate having a first bendable tab and a second bendable tab facing away from the first tab;
wherein the first leg includes a first central slot for reception of the first bendable tab and the second leg includes a second central slot for reception of the second bendable tab;
wherein the first and second cross members are secured to the base plate so as to allow for selective rotation of the first and second cross members in response to relative vertical movement of the first leg with respect to the second leg.

* * * * *